STEREOPHONIC FM RECEIVER
Filed March 11, 1966
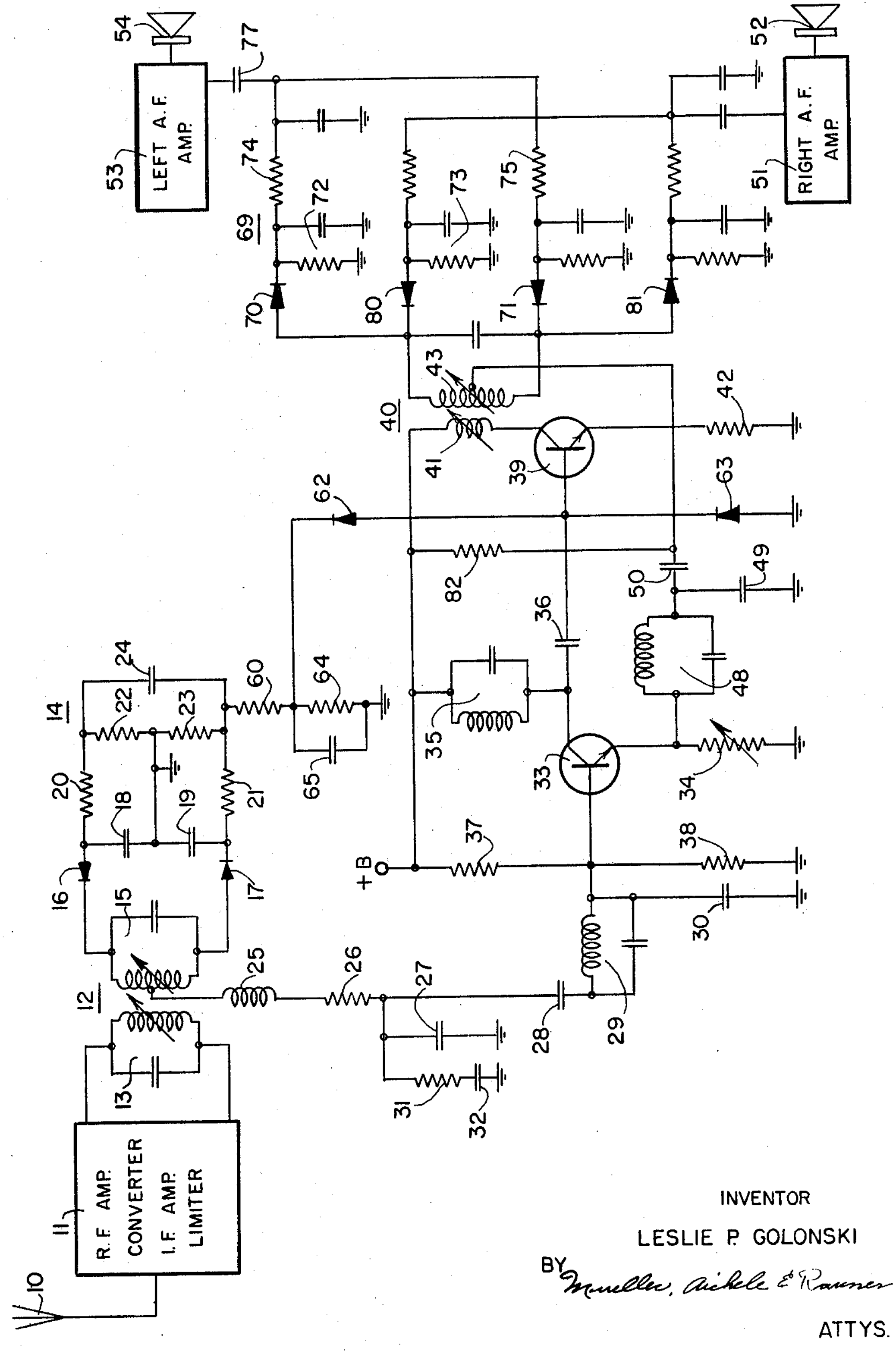
INVENTOR
LESLIE P. GOLONSKI
BY Mueller, Aichele & Rauner
ATTYS.

United States Patent Office 3,506,787
Patented Apr. 14, 1970

3,506,787

STEREOPHONIC FM RECEIVER

Leslie P. Golonski, Hanover Park, Ill., assignor to Motorola, Inc., Franklin Park, Ill., a corporation of Illinois Filed Mar. 11, 1966, Ser. No. 535,302
Int. Cl. H04h *5/00*
U.S. Cl. 179—15 6 Claims

ABSTRACT OF THE DISCLOSURE

In a stereophonic receiver, the input to a transistor amplifier in the frequency doubling circuit, for providing the 38 kc. reference signal in response to the 19 kc. pilot tone signal, is shunted with a normally conductive diode to prevent noise signals from being translated through the doubling circuit. The diode is reverse-biased in response to a received carrier wave of a predetermined magnitude to enable the 38 kc. doubling circuit to be responsive to the 19 kc. pilot tone signal applied to its input.

The present frequency modulated (FM) strereo system utilizes a broadcast signal which is a composite of three components, namely FM signal components extending from 30 cycles to 15 kilocycles (kc.) and representing the sum of right and left stereophonic information, a double sideband suppressed carrier amplitude modulated (AM) signal 38 kc. representing the difference of right and left stereophonic information in a band extending from 23 kc. to 53 kc., and a low amplitude 19 kc. pilot tone signal as a reference for producing a demodulating wave at 38 kc. for the suppressed carrier information. The circuit for producing the required demodulating wave may comprise a frequency doubler which is controlled by the pilot signal. It is desired to have the circuitry providing the 38 kc. demodulating wave operative only when an FM signal is being received. Otherwise, the subcarrier channel of the receiver would be responsive to random noise to produce false operation of the circuit which provides the 38 kc. wave and undesired noise at the loudspeaker.

It is an object of the present invention to provide a simple and inexpensive transistor circuit to prevent the triggering of the doubler on unwanted noise when no stereo FM station is received, or during the tuning operation of the receiver.

In a particular form of the invention a stereophonic receiver is used for producing stereophonic sound from a received carrier wave modulated by a composite signal including difference stereo signals modulated on a suppressed carrier wave, sum stereo signals and the pilot tone subcarrier signal having a frequency for reconstituting the suppressed carrier wave. The receiver comprises a pilot tone transmission path and a pilot tone reconstitution circuit. This reconstitution circuit has a transistor the input of which is connected to said transmission path. The output of the transistor is coupled to a resonant circuit tuned to the subcarrier frequency. The input of the transistor is further connected through a diode to a voltage divider through which a bias potential is applied to the diode from a frequency modulation detector to render the diode non-conductive when the pilot tone is applied through the transmission path to the transistor, and to render the diode conductive when no pilot tone signal is present to provide a shunt path for noise signal, and to prevent the noise signal being translated to the transistor.

The invention is illustrated in the drawing which is a schematic diagram of the stereophonic receiver including the noise squelch circuit.

In the receiver a frequency modulated carrier wave containing the sum signal of the right and left audio signals, the difference of the right and left audio signals amplitude modulated on a suppressed carrier wave, and a pilot signal having a frequency one-half that of the suppressed carrier frequency is received by the antenna 10 and applied to the circuit 11. This circuit 11 represents the usual RF amplifier converter, IF amplifier, and limiter which may be of known design. The output of the circuit 11 is coupled to a ratio detector 14 through a bandpass filter comprising two tuned resonant circuits 13 and 15, the inductances of which are the primary and secondary windings of a transformer 12. The composite signal containing the stereo sum signal, the difference stereo signal modulated on the suppressed carrier wave, and the pilot tone are detected in the ratio detector 14.

Although the ratio detector circuit is known it is described for the sake of completeness. The ratio detector includes diodes 16 and 17 which are connected to both sides of the resonant circuit 15 in opposite polarization. The free end of the diode 16 is connected through capacitor 18 and in parallel through resistor 20 in series with resistor 22 to ground. In the same way, the free end of the diode 17 is connected through capacitor 19 and in parallel through resistor 21 in series with resistor 23 to ground. A tertiary winding 25 of transformer 12 is connected to the center of the secondary winding and series connected through resistor 26 and capacitor 27 to ground. This winding is used to couple the primary composite FM stereo signal voltage in parallel with the two diodes. The same composite FM stereo signal is applied through the secondary resonant circuit to the ratio detector to provide equal voltages of opposite polarity for the diodes. A capacitor 24 connected across resistors 22 and 23 provides stabilizing voltage for the ratio detector. The voltage across this capacitor 24 varies in proportion to the signal amplitude as it charges through the two diodes and automatically adjusts itself to an operating DC voltage level. The capacitance of capacitor 24 is relatively high so that it takes an appreciable time for the ratio detector to charge it up after a signal is received.

The audio frequency signals representing the right and left signals and pilot signal are derived from the ratio detector at the junction of resistor 26 and capacitor 27, and are applied through capacitor 28 and a trap and band shaping circuit 29 to the input of the amplifier comprising transistor 33. The trap circuit comprises a parallel resonant circuit 29 bypassed by a capacitance 30 and a resistor 38. Transistor 33 functions as a 19 kilocycle amplifier and at the same time as a low impedance source for the audio signals which are available at the emitter of transistor 33. The variable resistor 34 is connected between the emitter of transistor 33 and ground for bias purposes. The collector of the transistor 33 is connected through a resonant circuit 35 to the B+ potential supply. The voltage divider 37 and 38 provides a potential for operating the base of transistor 33 of the 19 kilocycle amplifier. The resonant circuit 35 provides further selection of the 19 kilocycle pilot signal. The pilot signal is coupled through capacitor 36 to the base of transistor 39 of the frequency doubler stage. The collector of transistor 39 is connected through the primary winding 41 of transformer 40 to the B+ potential supply. The primary winding 41 is tuned to form a 38 kilocycle demodulating wave which is twice the frequency of the pilot signal and is phase locked thereto. Accordingly, the doubled frequency will appear across the tuned winding when the pilot signal is applied to the base of transistor 39 and the same conducts. A resistor 42 is connected between the emitter of transistor 39 and ground to provide a bias so that the threshold for rendering the transistor circuit conductive is higher than the base emitter junction threshold voltage.

The composite audio signal which is applied to the base of the 19 kilocycle amplifier is derived from the emitter of transistor 33 and is applied through a trap circuit 48 and capacitor 50 to the secondary winding 43 of transformer 40 which is part of the stereo detector circuit 69. Accordingly, the sum of the right and left audio frequency signals, as well as the suppressed carrier modulation components of the difference of the right and left signal will be applied from the emitter of transistor 33 to the center tap of the secondary winding of transformer 40. The secondary winding 43 of transformer 40, being center tapped, will also provide a 38 kilocycle demodulating wave having opposite phases at each end thereof. The secondary winding is connected to a stereo detector circuit 69 which will demodulate the difference signal and combine it with the audio frequency sum signal to produce a left and right audio frequency signal.

The stereo detector circuit 69 is known and is described in detail in U.S. Patent No. 3,225,143, but it will be described here in general terms for the sake of completeness. Each stereo detector channel includes a pair of diodes connected in pushpull. The left channel has diodes 70 and 71 which are oppositely polarized and fed with opposite phases of the 38 kilocycle demodulating wave from transformer 40. The cathode of diode 70 is connected through an RC network 72 to ground and the anode of diode 71 is connected through an RC network 73 to ground. The cathode of diode 70 is connected through resistor 74 and resistor 75 to the anode of diode 71. In this manner the 38 kilocycle demodulating wave is balanced out at the junction of resistors 74 and 75. However, at this point the combination of the envelope of the demodulated difference signal and the audio frequency sum signal appears so that they are combined to produce only the left audio frequency signal which is applied through capacitor 77 to amplifier 53 and reproduced in loudspeaker 54.

As may be seen, the diodes 80 and 81 are connected in a corresponding manner to transformer 40 and to amplifier 51, so that the opposite portion of the demodulating waves will cause conduction thereof and detection of the envelope of this wave will result in the combination of the sum and difference signals causing the production of only the right audio frequency signal which is applied to amplifier 51 and reproduced in loudspeaker 52.

The ratio detector 14 provides, as already mentioned, a DC voltage across capacitor 24. The positive polarity of the DC voltage is applied through resistor 60 to diode 62. The anode of diode 62 is connected to the base of transistor 39 in parallel with the emitter-base junction which base is further connected to the cathode of a diode 63 connected between base and ground. An RC circuit comprising resistor 64 and capacitor 65 is connected between the junction of resistor 60 and the diode 62 and ground.

Considering now the operation of the diode pilot squelch circuit, it is assumed that a stereo FM signal is received from a station. The ratio detector produces a voltage across capacitor 24 which reverse biases diode 62 with a positive potential at resistor 60. At the same time the 19 kilocycle pilot signal is applied through the 19 kilocycle amplifier and capacitor 36 to the base of transistor 39. One-half of the pilot signal wave is clipped by diode 63 and the other half will be conducted through the emitter-base junction causing the doubler action in the secondary winding 43 of transformer 40 to produce a 38 kilocycle demodulating wave which is phased locked to the pilot carrier. Because of the time delay which takes place to charge up capacitor 24 by the ratio detector, the doubler has a slow response to the detector which is desirable to insure stereo functioning only when the pilot signal is present for predetermined periods.

When no FM station is received e.g., when the receiver is tuned between stations, or there is little or no RF signal to the ratio detector, the voltage across capacitor 24 disappears or is so low that the diode 62 is rendered conductive to ground through bypass capacitor 65. If now unwanted noise including 19 kilocycle signals come through the 19 kilocycle amplifier, the diodes 62 and 63 conduct and they bypass respectively the positive and negative part of the unwanted noise signals to ground so that the 19 kilocycle portion of the noise signal cannot produce an unwanted noise by triggering the doubler on and off. Because the resistor 42 is connected between the emitter and ground of transistor 39, the voltage required at the base to render the transistor conductive is higher than the threshold voltage of the diodes 62 and 63, which have a threshold voltage of about 0.6 to 0.7 volt so that diode 62 conducts on the positive part of the noise signal and diode 63 conducts on the negative part of the noise signal bypassing the noise signal to ground.

When the receiver is tuned to a station broadcasting a monaural FM signal, the detected audio frequency is applied from winding 25 of transformer 12 through the emitter-base junction of transistor 33 to the center tap of secondary winding 43 of transformer 40. In order that the audio signals pass through the diodes 70 and 81 of the stereo detector 69 without excessive distortion, a positive DC bias is applied through resistor 82 so that the two diodes are always in the linear conduction region of their characteristic.

Since a non-stereo FM signal is detected in the ratio detector 14 a DC voltage is produced across capacitor 24 which reverse biases diode 62. However, this does not deteriorate the performance since the noise is cut down by the limiter in circuit 11 so that a noise signal with a 19 kilocycle portion does not reach the doubler.

Accordingly, the invention provides a stereophonic detection system which is automatically responsive to the presence or absence of a stereophonic broadcast signal in order to reduce background noise during tuning operation of the receiver.

I claim:

1. A stereophonic receiver for producing stereophonic sound from a received carrier wave modulated by a composite signal including difference stereo signals modulated on a suppressed carrier wave, sum stereo signals and a pilot tone subcarrier signal having a frequency for reconstituting the suppressed carrier wave, said receiver including in combination, first circuit means responsive to the pilot tone to develop a signal representing the suppressed carrier wave, voltage controlled switching means coupled to said first circuit means, said voltage controlled switching means including a normally conductive diode connected in shunt with a portion of said first circuit means to prevent noise signals being translated through said first circuit means, second circuit means responsive to the received carrier wave to develop a voltage for biasing said diode non-conductive so that the pilot tone signal is applied to said first circuit means to provide the suppressed carrier wave.

2. The stereophonic receiver according to claim 1 wherein said voltage controlled switching means comprises a voltage divider coupled to said second circuit means, said diode being coupled to said voltage divider with a polarity to be biased non-conductive when said second circuit means provides said voltage.

3. A stereophonic receiver according to claim 1 wherein said first circuit means comprises a pilot tone transmission path and a pilot tone reconstitution circuit having a transistor and an output circuit tuned to the subcarrier frequency, said transistor being coupled in said pilot tone transmission path and to said diode and said transistor generating said suppressed carrier wave in said output circuit when said pilot tone is applied thereto and said diode is not conducting.

4. The stereophonic receiver according to claim 3 wherein said transmission path is responsive to a 19 kilocycle pilot tone and said pilot tone reconstitution circuit is a doubler stage the output circuit of which is tuned to 38 kilocycles.

5. The stereophonic receiver according to claim 4 wherein the pilot tone transmission path is rendered responsive to received carrier wave signals of a predetermined magnitude and wherein the second circuit means providing the voltage for biasing said diode non-conductive provides said biasing voltage when said received carrier wave is in excess of said predetermined magnitude.

6. A sterophonic receiver for producing stereophonic sound from a received carrier wave modulated by a composite signal including difference stero signals modulated on a suppressed carrier wave, sum stereo signals and a pilot tone subcarrier signal having a frequency for reconstituting the suppressed carrier wave, said receiver including in combination, first circuit means responsive to the pilot tone to develop a signal representing the suppressed carrier wave, voltage controlled switching means comprising a voltage divider and a diode coupled to the voltage divider with a polarity to be biased non-conductive when a predetermined voltage is applied thereto, the diode being normally conductive and connected in shunt with a portion of said first circuit means to prevent noise signals being translated through the first circuit means, second circuit means responsive to the received carrier wave to develop said predetermined voltage for biasing the diode non-conductive when said second circuit means demodulates said received carrier wave so that the pilot tone signal is supplied to the first circuit means to provide the suppressed carrier wave.

References Cited

UNITED STATES PATENTS

| | | | |
|---|---|---|---|
| 2,630,527 | 3/1953 | Vilkomerson | 325—348 |
| 3,187,103 | 6/1965 | Loughlin et al. | |
| 3,264,414 | 8/1966 | Santilli et al. | |
| 3,270,138 | 8/1966 | Golonski. | |
| 3,306,980 | 2/1967 | Nakamura et al. | |
| 3,319,006 | 5/1967 | Neidig et al. | |
| 3,423,536 | 1/1969 | Snyder. | |

ROBERT L. GRIFFIN, Primary Examiner

R. S. BELL, Assistant Examiner

U.S. Cl. X.R.

325—329, 348